(12) United States Patent
Maurice et al.

(10) Patent No.: US 10,478,645 B2
(45) Date of Patent: Nov. 19, 2019

(54) SAFETY REMOVABLE ANCHORING DEVICE

(71) Applicant: ZEDEL, Crolles (FR)

(72) Inventors: Alain Maurice, Saint Hilaire du Touvet (FR); Olivier Mathé, Taninges (FR); Pierre-Olivier Chabod, Pontcharra (FR)

(73) Assignee: ZEDEL, Crolles (FR)

( * ) Notice: Subject to any disclaimer, the term of this patent is extended or adjusted under 35 U.S.C. 154(b) by 0 days.

(21) Appl. No.: 15/295,124

(22) Filed: Oct. 17, 2016

(65) Prior Publication Data

US 2017/0138533 A1 May 18, 2017

(30) Foreign Application Priority Data

Nov. 18, 2015 (FR) ...................................... 15 61081

(51) Int. Cl.
| | | |
|---|---|---|
| *A62B 35/00* | (2006.01) | |
| *A63B 29/02* | (2006.01) | |
| *F16B 13/08* | (2006.01) | |

(52) U.S. Cl.
CPC ........ *A62B 35/0068* (2013.01); *A63B 29/024* (2013.01); *F16B 13/0891* (2013.01)

(58) Field of Classification Search
CPC . A63B 29/024; A63B 29/025; Y10S 248/925; F16B 13/063; F16B 13/0891; F16B 19/109; E04G 21/3276; A62B 35/0068
USPC .... 248/231.9, 925; 405/259.1, 259.3, 259.4; 52/704, 3, 125.4; 411/348
See application file for complete search history.

(56) References Cited

U.S. PATENT DOCUMENTS

| | | | | |
|---|---|---|---|---|
| 3,352,193 A | * | 11/1967 | Lerich ................. | E21D 21/0026 411/79 |
| 3,424,050 A | * | 1/1969 | Burrow ................... | F16B 4/002 24/453 |
| 4,074,609 A | * | 2/1978 | Busler ................... | F16B 13/065 411/45 |
| 4,506,924 A | | 3/1985 | Nieder | |
| 4,513,641 A | * | 4/1985 | Murray ................ | A63B 29/024 29/278 |
| 4,813,832 A | * | 3/1989 | Gerhard .............. | F16B 13/0816 411/448 |
| 6,068,226 A | * | 5/2000 | Anders ................ | A63B 29/024 248/231.91 |

(Continued)

FOREIGN PATENT DOCUMENTS

WO 2014/060481 A1 4/2014

*Primary Examiner* — Jonathan Liu
*Assistant Examiner* — Guang H Guan
(74) *Attorney, Agent, or Firm* — Oliff PLC (57) ABSTRACT

A removable anchoring device comprising a fixed first part with an expansion head, and a movable second control part having wedging half-rings and a gripping knob associated with a stop and a spring. The stop is arranged on the fixed first part and is movable with respect to the gripping knob by a relative translational movement to disable any release command in a predefined position. The gripping knob is thus able to occupy a first axial adjustment position offset from the stop to indicate the non-locked state enabling the release command, and is movable to a second axial adjustment position in engagement against the stop to indicate the locked state and to disable said release command.

8 Claims, 7 Drawing Sheets

(56) References Cited

U.S. PATENT DOCUMENTS

| | | | |
|---|---|---|---|
| 6,729,821 B2 | 5/2004 | Guthrie et al. | |
| 7,258,316 B2 * | 8/2007 | Reeves | A63B 29/024 248/231.91 |
| 8,839,591 B2 * | 9/2014 | Guthrie | E04G 21/3276 248/231.9 |
| 8,870,244 B2 * | 10/2014 | Liang | E05B 1/0038 292/173 |
| 8,894,329 B1 * | 11/2014 | Kekahuna | F16B 13/066 405/259.3 |
| 9,255,594 B2 * | 2/2016 | Cabrit | A63B 29/024 |
| 2002/0098054 A1 | 7/2002 | Guthrie et al. | |
| 2015/0300392 A1 | 10/2015 | Cabrit et al. | |
| 2017/0138533 A1 * | 5/2017 | Maurice | F16B 13/0891 |

* cited by examiner

SAFETY REMOVABLE ANCHORING DEVICE

BACKGROUND OF THE INVENTION

The invention relates to a removable anchoring device designed to be fixed in an aperture or a bore hole, and able to be easily disassembled and recovered, said device comprising:
- a fixed first part with an expansion head,
- a second movable control part having wedging means collaborating with the end head to perform blocking or releasing inside the bore hole, and a gripping knob connected to the wedging means by an operating rod system or cables,
- and a spring biasing the wedging means in the blocking direction.

STATE OF THE ART

Removable anchoring devices able to be inserted and extracted without tools in a bore hole drilled in a rock or a concrete wall are known from the prior art. Extraction is generally performed by pulling on a releasing control, which results in the wedging means escaping from the expansion head. The document EP 2909488 refers to a removable expansion anchorage having a structure with a rigid pin, and the document U.S. Pat. No. 6,729,821 concerns a flexible cable-based anchorage. These two types of known anchoring devices are both provided with a gripping knob, which when pulled back against the force of a spring performs releasing for fitting in the bore hole, and extraction thereof. When no actuation is performed on the gripping knob, blocking is automatically re-established due to the thrust of the spring. The resulting expansion effect ensures efficient blocking which is enhanced by the weight of the suspended load or user. The same is not the case on no-load, i.e. without a suspended weight on the anchorage. It then simply suffices to pull on the gripping knob with a moderate force to overcome the strength of the spring and extract the device from its hole without any additional deliberate action.

The documents U.S. Pat. No. 4,506,924 and 2002/0098054 describe anchoring devices having wedging means in the form of wedges collaborating with the expansible end head.

OBJECT OF THE INVENTION

The object of the invention consists in producing a removable anchoring device having an additional function confirming blocking in the inserted state in the bore hole.

The apparatus according to the invention is characterized in that the gripping knob is associated with a stop arranged on the fixed first part, said knob and stop being movable with respect to another by a relative translational movement to disable any release command in a predefined position.

Preferentially, the gripping knob is able to occupy a first axial adjustment position offset from the stop to indicate the non-locked state enabling the release command, and is movable to a second axial adjustment position in engagement against the stop to indicate the locked state and to disable said release command.

The indicator is invisible in the second axial position, indicating the locked state in which the two half-rings can no longer move back on the expansion head and lose contact with the inside wall of the bore hole. To return to the non-locked state, it is imperative to manually move the gripping knob again in the opposite direction to the first adjustment position. A specific manual action is therefore necessary from the user to lock and unlock the device.

According to a first preferential embodiment, the wedging means comprise at least two half-rings driven by the operating rod system solidly attached to a drive sleeve on which the gripping knob is mounted. The stop is arranged at the end of an extension of the fixed first part and facing the gripping knob. The gripping knob comprises a tapped axial bore which collaborates with a conjugate thread provided on the drive sleeve to move said gripping knob between the first and second adjustment positions.

Advantageously, the stop is provided with an axial flange having a coloured cylindrical lateral surface to constitute an indicator indicating, when it is visible, that the anchoring device is in a non-locked inserted state.

Preferentially, the translational movement of the gripping knob between the two axial adjustment positions is achieved by turning said knob in the tightening or loosening direction depending on the type of screw thread used for the thread.

According to a second embodiment, a removable anchoring device presents a flexible structure in which the fixed first part comprises a cable terminated by the expansion head. The gripping knob of the second movable part is axially adjustable to collaborate in the locked state with the stop securedly affixed to the cable.

The removable anchoring device according to the present invention advantageously applies to mountain climbing, potholing and working at heights.

BRIEF DESCRIPTION OF THE DRAWINGS

Other advantages and features will become more clearly apparent from the following description of an embodiment of the invention given for non-restrictive example purposes only and represented in the appended drawings, in which.

DESCRIPTION OF TWO PARTICULAR EMBODIMENTS

With reference to FIGS. 1A, 1B and 2-5, the removable safety anchoring device 10 according to the present invention is configured to be fixed in a bore hole or a cylindrical hole drilled beforehand in a rock face or a concrete wall in order to support a suspended person or load in complete safety. After it has been used, the anchoring device 10 has to be able to be easily removed and recovered by extraction from the bore hole 11.

Figure 1A:
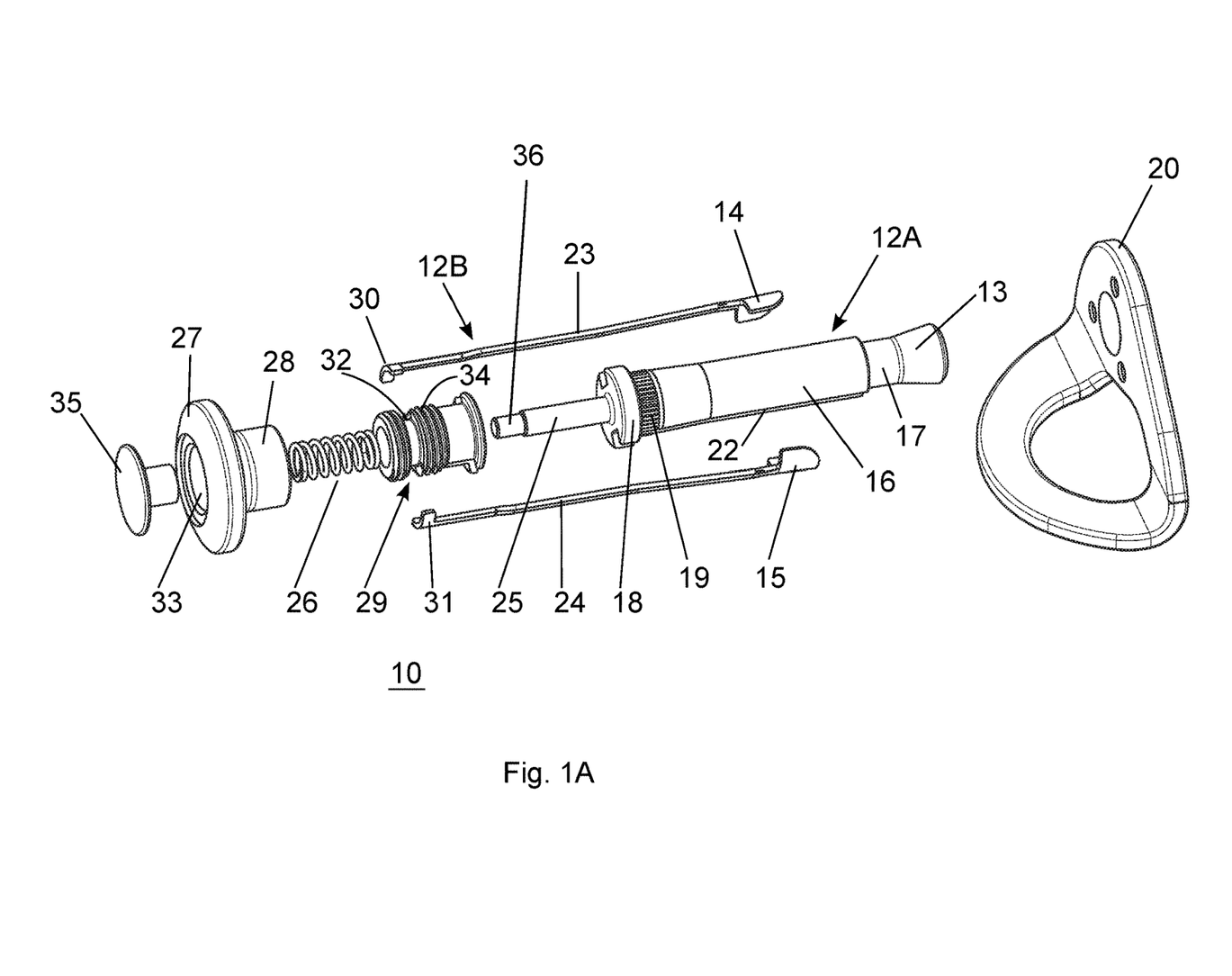
FIG. 1A is an exploded perspective view of the removable anchoring device according to a first embodiment of the invention.
Figure 1B:
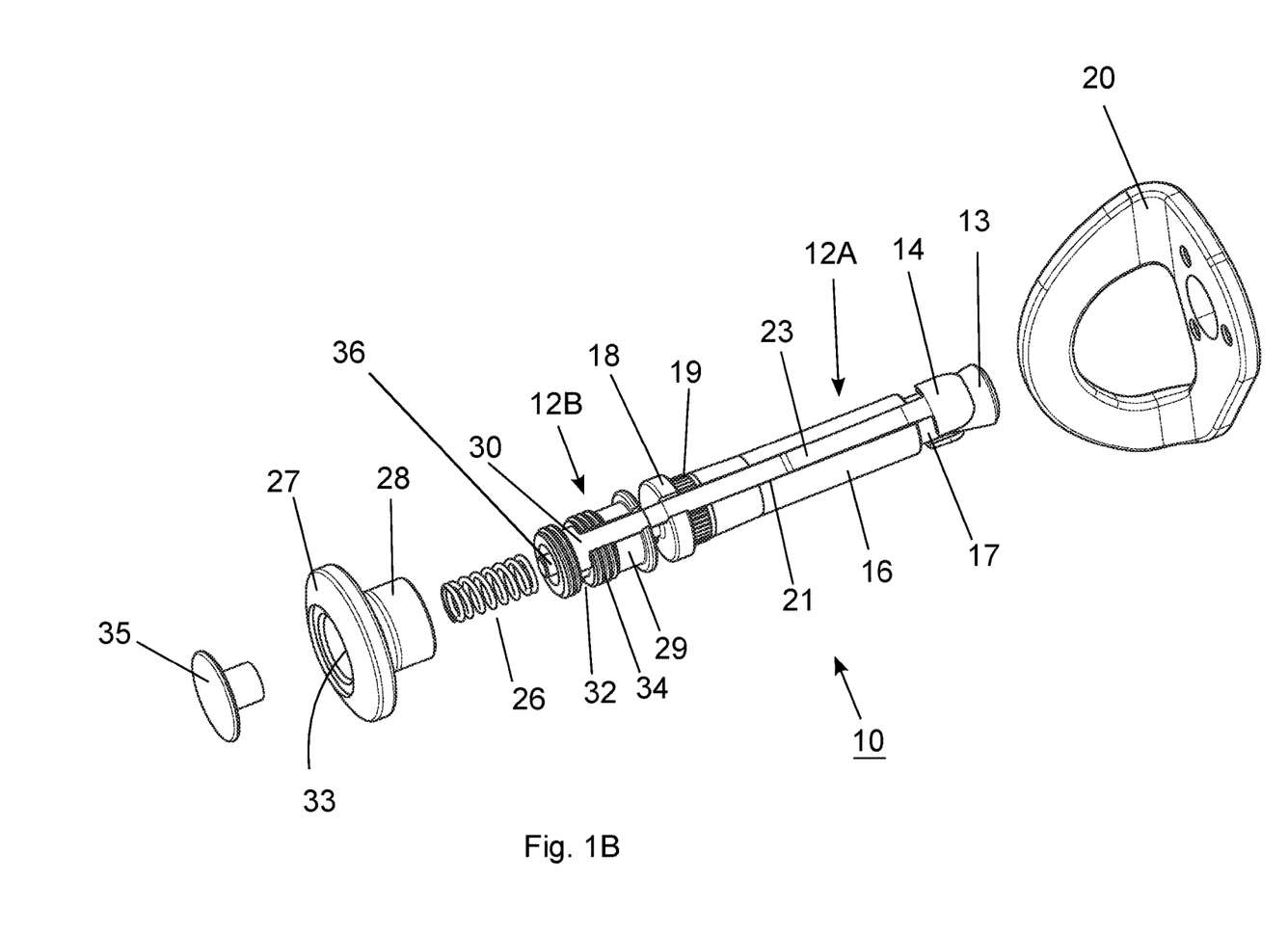
FIG. 1B represent an identical view to FIG. 1A, after the second control part has been fitted on the fixed first part.

The anchoring device 10 is composed of a fixed first part 12A in the form of a rigid bolt with a frustum-shaped expansion head 13 able to be inserted in the bore hole 11, and a second movable control part 12B which is equipped with wedging means, for example in the form of half-rings 14, 15. These half-rings are designed to collaborate by translation with the frustum-shaped lateral surface of the end head 13 to cause blocking or releasing of the device in an expansion area inside the bore hole 11.

The fixed first part 12A comprises an axially elongate shank 16 of cylindrical cross-section. The rigid shank 16 is extended towards the frustum-shaped end head 13 by a constricted section 17 in which the expansible half-rings 14, 15 extend coaxially. The shank 16 is provided with an annular stop 18 and with a stop device 19 on which an anchoring plate 20 acting as suspension means is fitted. The plate 20 presses on the apparent surface of the wall outside the bore hole 11, but the whole of the portion of the shank 16 between the plate 20 and the end head 13 is sunk inside the bore hole 11.

The body of the shank 16 is further provided with two diametrically opposite longitudinal grooves 21, 22 in which an operating rod system 23, 24 is slidingly engaged to activate the two half-rings 14, 15 of the second control part 12B between a wedging position when expansion takes place and a releasing position. Starting from the stop 18, and opposite the end head 13, the shank 16 is extended by a cylindrical intermediate section 25 of smaller diameter than that of the shank 16 on which a compression spring 26 with helicoidal turns is threaded.

Translation of the operating rod system 23, 24 with the expansion half-rings 14, 15 is performed manually by means of a gripping knob 27 extended by a tubular end-part 28. The diameter of the gripping knob 27 is larger than that of the end-part 28, which coaxially surrounds a drive sleeve 29 of the operating rod system 23, 24. Opposite the half-rings 14, 15, the operating rod system 23, 24 comprises attachments 30, 31 fixed in an annular groove 32 of the drive sleeve 29.

The compression spring 26 extends inside the tubular sleeve 29 so as to bias it in axial translation to the right against the stop 18 of the shank 16 (FIG. 2) and in the engagement direction of the half-rings 14, 15 on the frustum-shaped end head 13. A threaded axial bore 33 passes through the gripping knob 27 and end-part 28 and collaborates with a conjugate thread 34 provided on the external lateral surface of the drive sleeve 29.

A stop 35 is fixed on a terminal axial extension 36 of the intermediate section 25 of the fixed first part 12A to limit the translational travel of the movable gripping knob 27. The diameter of the axial extension 36 is smaller than that of the section 27. The stop 35 is provided with an axial flange 37 having a red-coloured cylindrical lateral surface to constitute an indicator 38 indicating, when it is visible, that the anchoring device 10 is not locked in the bore hole 11.

Figure 2:
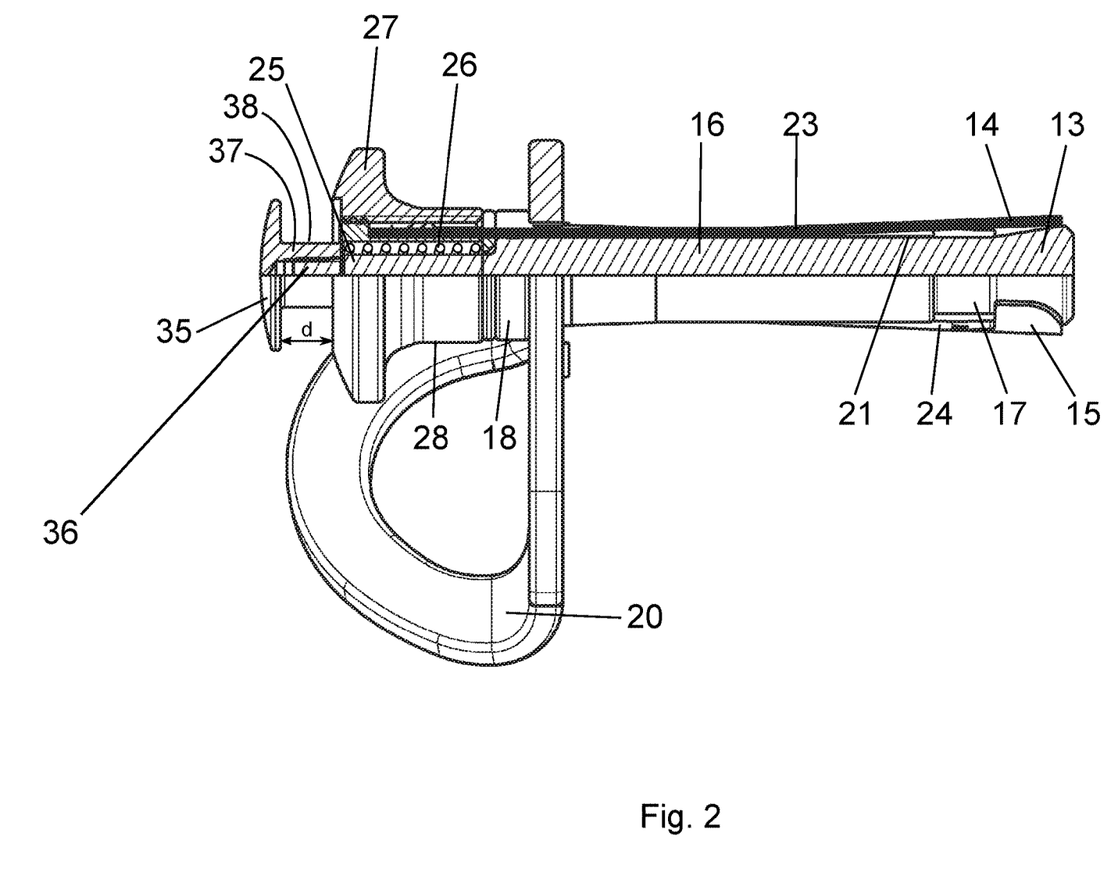
FIG. 2 is an axial cross-sectional view of the anchoring device shown in the initial state outside the bore hole and without any action on the gripping knob.

Operation of the removable anchoring device 10 according to the invention is as follows:

In FIG. 2, the anchoring device 10 is in the initial state, i.e. not depressed in the bore hole 11. The gripping knob 27 is inactive and axially offset from the fixed stop 35 by an axial distance d. The drive end-part 28 of the operating rod system 23, 24 is securedly held against the stop 18 by the action of the compression spring 26. The two half-rings 14, 15 are engaged on the frustum-shaped end head 13 of the shank 16. In this initial state, any depression of the anchoring device 10 in the bore hole 11 is rendered impossible due to the presence of the half-rings 14, 15 on the end of the cone.

Figure 3:
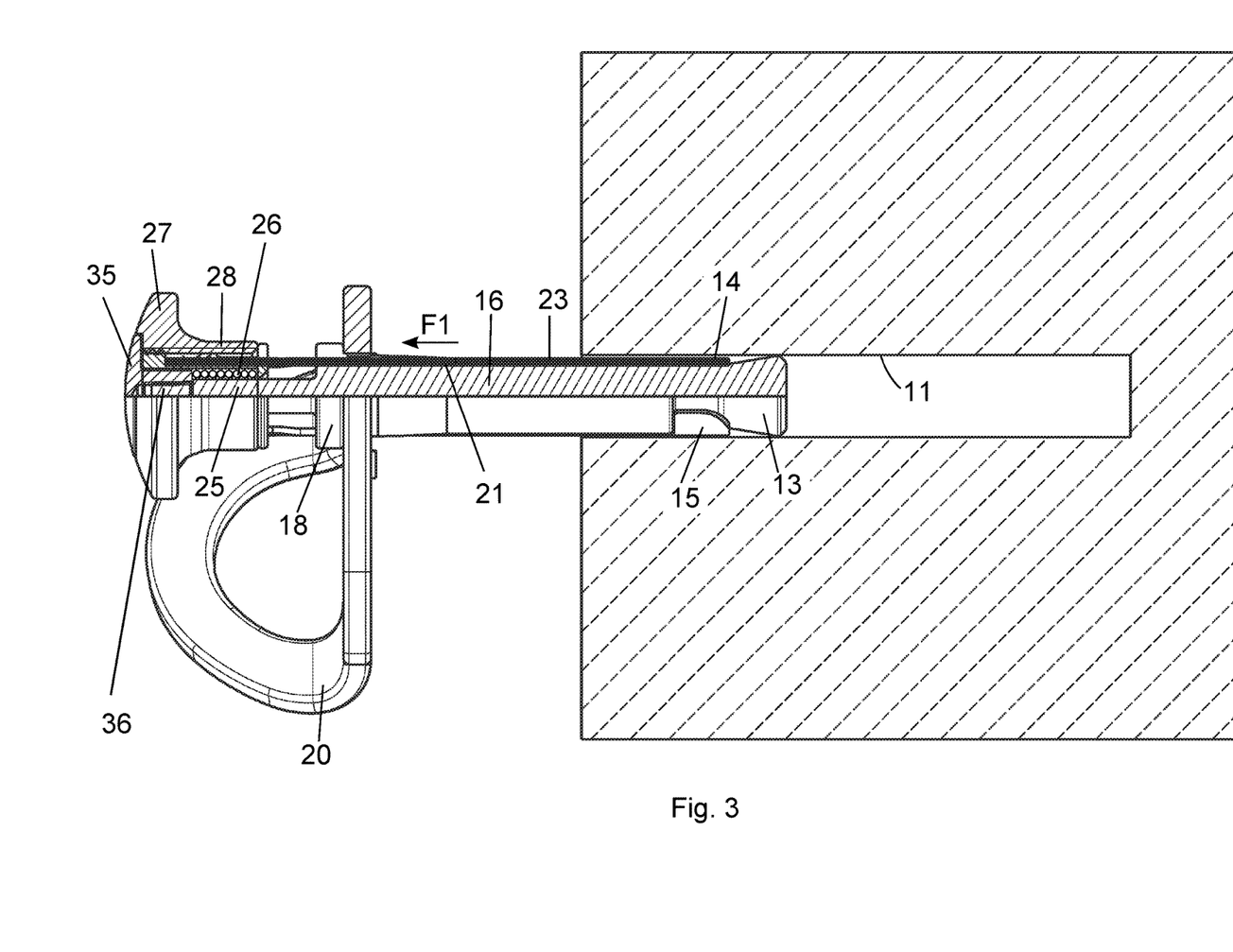
FIG. 3 is an identical view to FIG. 2, in the course of insertion in the bore hole.

In FIG. 3, the anchoring device 10 is ready to be inserted in the bore hole 11 following the withdrawal movement of the gripping knob 27 against the fixed stop 35. The sleeve 29 moves back with the gripping knob 27 and drives the operating rod system 23, 24 in the same direction (arrow F1), and also the half-rings 14, 15 which leave the frustum-shaped end head 13 positioning themselves in the constricted part 17 of the shank 16. The large terminal base of the frustum-shaped head 13 presents a slightly smaller diameter than the diameter of the bore hole 11, which enables axial insertion of the shank 16. The compression spring 16 is compressed during the withdrawal movement of the knob and of the sleeve 29.

Figure 4:
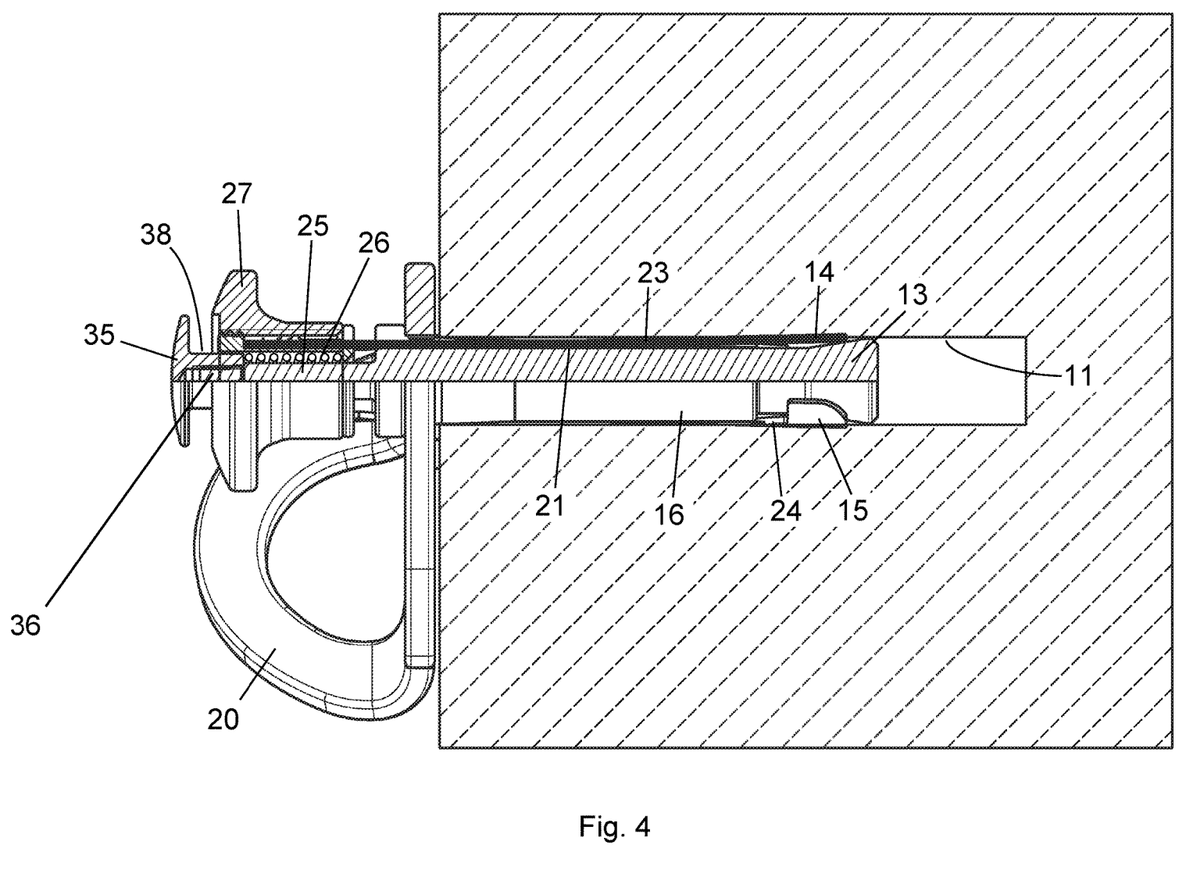
FIG. 4 represents the anchoring device in the non-locked inserted state.

FIG. 4 represents the anchoring device 10 in the inserted non-locked state. The plate 20 presses on the outer wall with a maximum depression of the shank 16 in the bore hole 11. After the gripping knob 27 has been released, the spring 16 relaxes and repels the two half-rings 14, 15 towards the cone of the end head 13 up to the contact point with the inner wall of the bore hole 11. The resulting expansion effect ensures efficient blocking which is enhanced by the weight of the load or user suspended on the plate 20. But if there is no weight on the plate 20, a traction exerted on the gripping knob 27 enables immediate release and makes extraction of the anchoring device 10 possible. The red indicator 38 is visible, which indicates that the anchoring device 10 is not locked in the inserted state. In this non-locked state, the gripping knob 27 occupies a first adjustment position on the section 25, with a predefined axial offset with respect to the stop 35.

Figure 5:
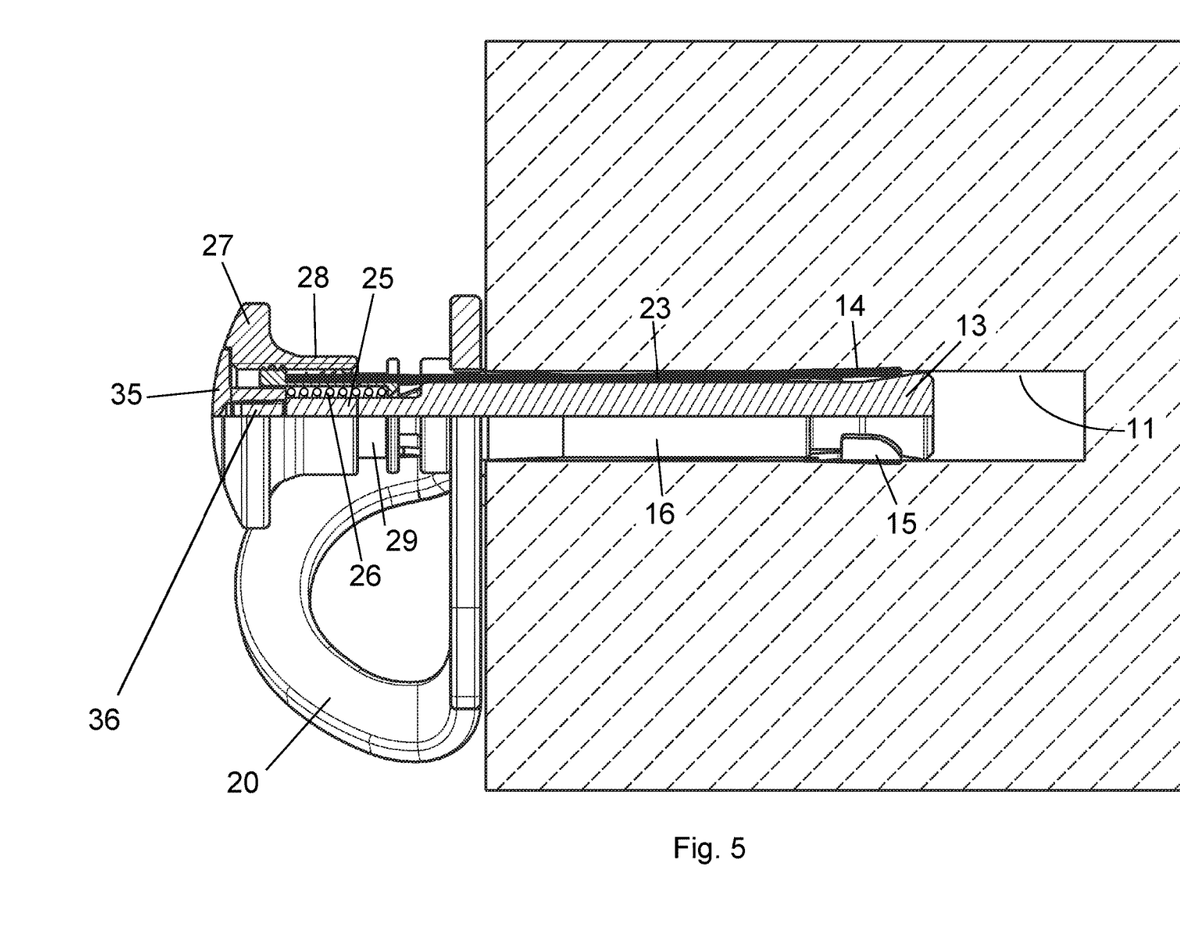
FIG. 5 represents the anchoring device in the inserted and locked state following movement of the gripping knob to a position pressing against the stop.

In FIG. 5, the anchoring device 10 is in the locked inserted state. Movement from the non-locked inserted state to the locked inserted state is achieved by moving the gripping knob 27 towards the stop 35. The gripping knob 27 then occupies a second adjustment position located withdrawn from the first position so as to come into engagement with the stop 35 to thereby disable any unlocking movement of the second control part 12B. The red indicator 38 becomes invisible in this second axial position indicating the locked state in which the two half-rings 14, 15 can no longer move back on the cone of the end head 13 and lose contact with the inner wall of the bore hole 11. To return to the non-locked state of FIG. 4, it is imperative to move the gripping knob 27 back manually in the opposite direction to the first adjustment position, with the formation of a certain axial offset with respect to the fixed stop 35, allowing release and extraction of the anchoring device 10.

The translational movement of the gripping knob 27 between the two axial adjustment positions is achieved by turning the knob 27 with the end-part 28 in the tightening or loosening direction depending on the type of screw thread used to form the thread 34. In the cases described in the foregoing, the screw thread 34 is a left-hand thread, which enables the gripping knob 27 to be tightened to achieve the locked state of FIG. 5.

If the thread 34 is a right-hand thread, the gripping knob 27 will have to be loosened to move it in the locked state to the second adjustment position in contact with the stop 35.

Such a screw-based adjustment system is particularly advantageous as it enables the locked state to be obtained independently from the diameter of the bore hole 11, due to the fact that the second control part 12B is able to stop at different places.

It is naturally possible to perform relative translational movement of the gripping knob 27 and of the stop 35 by any other equivalent mechanical system to prevent releasing in the locked inserted state of the anchoring device 10. It suffices to have two stops, one on the fixed first part 12A and the other on the second control part 12B, and to move the two stops relatively to one another to disable the release command in the locked state.

In the case of rigid operating rods 23, 24, the disabled movement of the second control part 12B in the locked state in addition causes a compression effect of the operating rod system on the half-rings 14, 15 to enhance anchoring.

Figure 6:
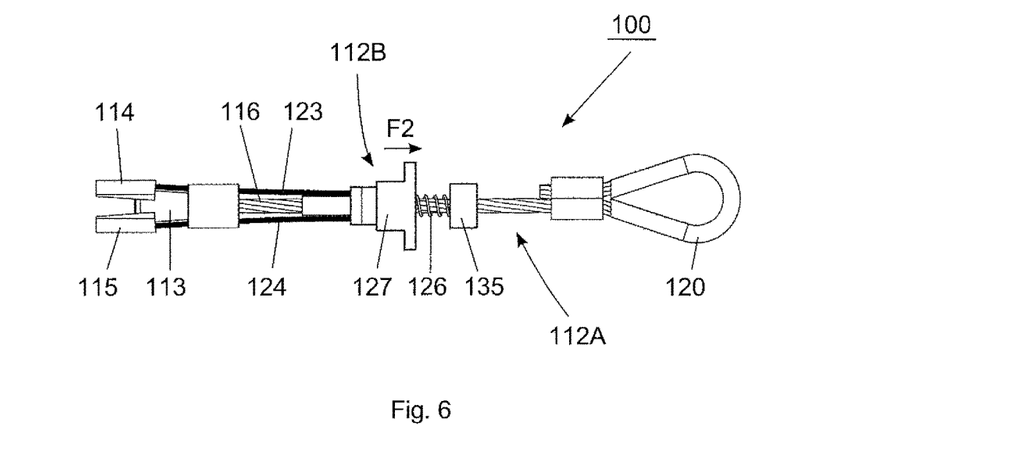
FIGS. 6 and 7 illustrate a second embodiment of the invention in which the fixed first part is formed by a flexible cable.
Figure 7:
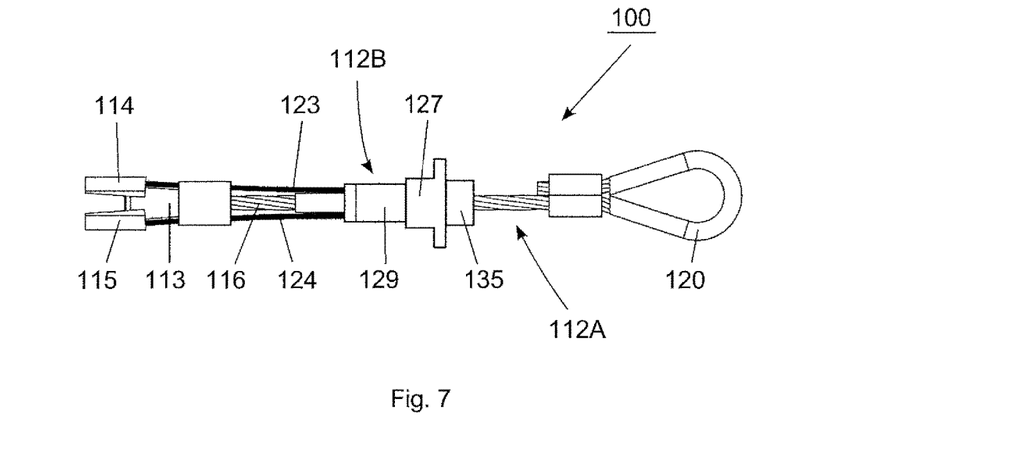

The alternative embodiment of FIGS. 6 and 7 shows a flexible removable anchoring device 100 instead of the rigid anchoring device 10 of FIGS. 1A, 1B and 2-5. The same reference numerals will be used to designate similar parts but these numerals will be preceded by one hundred.

The fixed first part 112A is formed by a high-resistance cable 116 instead of the metal shank 16, one of the ends of the cable 116 being shaped as an attachment loop 120, and the other end being equipped with an expansion head, in particular a frustum-shaped head 113.

The movable second part 112B comprises a gripping knob 127 designed to move two half-rings 114, 115 collaborating by translation with the frustum-shaped head 113. Instead of the rigid operating rod system, operating cables 123, 124 are used to connect the half-rings 114, 115 to the gripping knob 127. A compression spring 126 is arranged around the cable 116 between the gripping knob 127 and a stop 135 fixed on the cable 116.

Releasing is performed in conventional manner by pulling on the gripping knob from a first axial adjustment position in the direction of the arrow F2 (FIG. 6) until it comes into engagement against the stop 135. The half-rings 114, 115 move away from the frustum-shaped end head 113 and enable insertion in the opening of the bore hole.

To block the anchoring device 100 once it has been inserted in the bore hole, the gripping knob 127 is positioned, for example by tightening or loosening along a sleeve 129, in a second adjustment position against the stop 135 (FIG. 7). Any releasing movement becomes impossible and the anchoring device 100 is secured in the locked inserted state. To perform unlocking, the gripping knob 127 will have to be placed back in the first adjustment position of FIG. 6, which is axially offset from the stop 135.

According to another variant, the wedging parts can be formed by cams or wedges. The expansion head can be of any shape according to the type of wedging means.

Invention applies to any type of removable anchorage having to be locked after installation.

The invention claimed is:

1. A removable anchoring device, designed to be fixed in a bore hole and able to be easily disassembled and recovered from the bore hole, the removable anchoring device comprising:
    a fixed first part with an expansion head,
    a second movable control part having wedging means collaborating with the expansion head to perform blocking or releasing of the removable anchoring device inside the bore hole, and a gripping knob connected to the wedging means by operating rods, and
    a spring biasing the wedging means in a blocking direction, wherein the gripping knob is associated with a stop arranged on the fixed first part, and the gripping knob being movable with respect to the stop by a relative translational movement to disable any release command in a predefined position of the gripping knob,
    wherein the wedging means comprise at least two half-rings driven by the operating rods solidly attached to a drive sleeve, the gripping knob being mounted on the drive sleeve, and
    wherein the gripping knob comprises a tapped axial bore, the tapped axial bore collaborating with a conjugate thread provided on the drive sleeve to move the gripping knob between a first axial adjustment position offset from the stop to indicate a non-locked state enabling the release command, and a second axial adjustment position in engagement against the stop to indicate a locked state and to disable the release command.

2. The removable anchoring device according to claim 1, wherein the operating rods are fixed by attachments in an annular drive groove of the drive sleeve supporting the gripping knob.

3. The removable anchoring device according to claim 1, wherein the stop is arranged at an end of an extension of the fixed first part to limit the relative translational movement of the gripping knob with respect to the stop.

4. The removable anchoring device according to claim 1, wherein the stop is provided with an axial flange having a colored cylindrical lateral surface to constitute an indicator indicating, when the indicator is visible, that the removable anchoring device is in the non-locked state.

5. The removable anchoring device according to claim 1, wherein the relative translational movement of the gripping knob with respect to the stop between the first axial adjustment position and the second axial adjustment position is able to be achieved by turning the gripping knob in a tightening direction or a loosening direction depending on a type of screw thread used for the conjugate thread.

6. The removable anchoring device according to claim 5, wherein for a left-hand thread of the screw thread, the gripping knob is configured to be turned counterclockwise in the tightening direction to move the gripping knob to the locked state.

7. The removable anchoring device according to claim 5, wherein for a right-hand thread of the screw thread, the gripping knob is configured to be turned clockwise in the loosening direction to move the gripping knob to the locked state.

8. The removable anchoring device according to claim 1, wherein the expansion head is frustum-shaped and the half-rings engage the expansion head when the blocking of the removable anchoring device is performed.

\* \* \* \* \*